Nov. 25, 1958     N. W. ROUDABUSH     2,861,793
BRICKS
Filed July 5, 1957
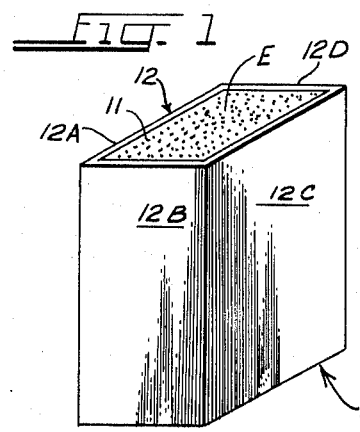
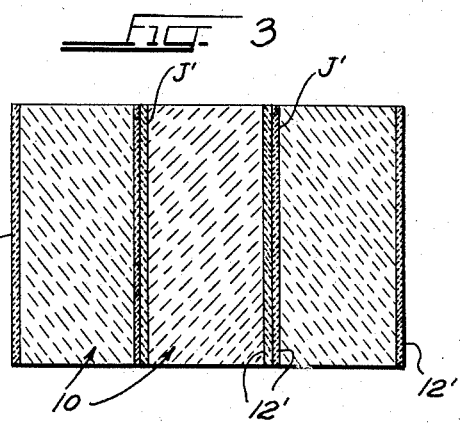
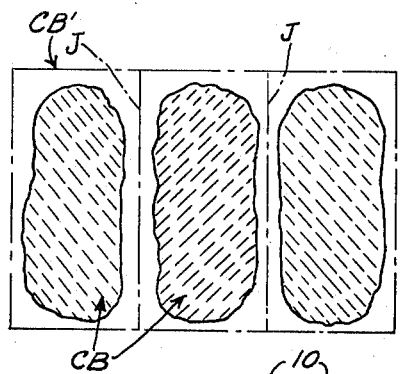
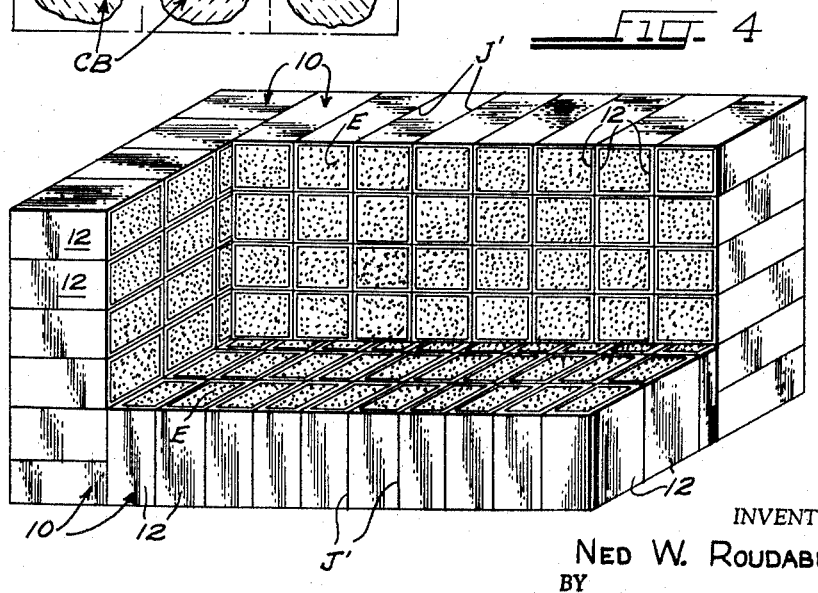
INVENTOR.
NED W. ROUDABUSH
BY James B. Kinzer
Atty.

United States Patent Office 2,861,793
Patented Nov. 25, 1958

2,861,793
BRICKS
Ned W. Roudabush, Broomall, Pa.
Application July 5, 1957, Serial No. 670,128
1 Claim. (Cl. 266—43)

This invention relates to bricks for lining furances in which molten aluminum is to be handled incidental to refinement or alloyment.

The type of brick ordinarily approved for lining a furnace of the foregoing kind is composed essentially of alumina which may be as low as forty percent (remainder essentially siliceous material) for general commercial furnace application to as high as ninety to ninety-nine percent alumina (remainder essentially siliceous material) for certain installations where specification of high purity of the brick controls the installation rather than cost of the brick.

The reason that alumina is used as the essential refractory in bricks for aluminum treating furnaces is that aluminum tends to react with silica and as a consequence becomes contaminated with silicon which in most instances is an unacceptable impurity. Moreover, there is a tendency for aluminum to react with certain types of ceramic binders used in manufacture of the bricks. The reaction between aluminum and silica is accompanied by corrosion of the bricks as will be pointed out hereinafter, and such corrosion is represented by a peculiar attack pattern that reduces by a large factor the life of the furnace lining. The furnace life problem is perhaps more to be reckoned with from an economical standpoint than is the possibility of aluminum contamination, because eventually the furnace must be shut down and relined.

A one hundred percent pure alumina brick is not commercially feasible, so that some silica is bound to be present, and the foregoing problem will exist to a lesser or greater degree in all such furnace installations. It is therefore an object of the present invention to reduce by a large factor the probability, or rate over a prolonged period, of reaction between aluminum in a brick-lined furnace and silica present in the refractory brick used to line aluminum treating furnaces, and to accomplish this specifically by cladding the brick in aluminum plate. While stress has been placed on alumina brick because of the acid nature thereof, it is possible that basic brick such as those composed of magnesite or chrome ore would be used as furnace linings for aluminum treating furnaces, and these too will contain some silica so that the present invention is applicable also to basic refractory brick containing silica.

Other and further objects of the present invention will be apparent from the following description and claim and are illustrated in the accompanying drawing, which, by way of illustration, shows a preferred embodiment of the present invention and the principle thereof and what I now consider to be the best mode in which I have contemplated applying that principle. Other embodiments of the invention embodying the same or equivalent principles may be used and structural changes may be made as desired by those skilled in the art without departing from the present invention and the purview of the appended claim.

In the drawings:
Fig. 1 is a perspective view of a brick constructed in accordance with the present invention;
Fig. 2 is a partly schematized sectional view of a portion of a furnace wall lined with conventional bricks and illustrating in solid lines the highly disadvantageous corrosion pattern that commonly occurs therein;
Fig. 3 is a partly schematized sectional view similar to Fig. 2 but showing the condition prevailing at the brick joints under the present invention; and
Fig. 4 is a schematic view showing the manner of placement of bricks in a furnace for handling aluminum.

Under the present invention, refractory bricks, containing some silica as an undesirable but nevertheless to-be-expected impurity, to be used for lining the bottom and side walls of an aluminum furnace, are each clad individually in aluminum plate typically of one thirty-second to one sixteenth inch thick. The lining is extended about the four elongated sides only of the brick so that the refractory core is exposed at the two ends thereof (one of which will be the hot end) and in placing the bricks during construction of the furnace walls these are laid in so-called soldier style with their so-called hot ends pointing inwardly toward the furnace cavity in accordance with a standard procedure. Thus, a brick constructed in accordance with the present invention is illustrated at 10 in Fig. 1 of the drawing and includes a core 11 preferably essentially of alumina but which will inherently contain some silica as has been explained. Preferably, the alumina contained in the core 11 is chemically bonded as with phosphoric acid. The brick 10 includes a sheet of aluminum plate 12 extended about the four elongated sides of the core 11 leaving the two ends of the core exposed.

Various alternatives can be used in achieving this construction. The aluminum plate can be placed in the mold so that three sides 12A, 12B and 12C, Fig. 1, line the mold, and after the refractory core has been pressed the fourth side 12D of the plate 12 can be bent over to complete the assembly. The advantage of this procedure is that such will materially reduce die wear in the mold. Alternatively, the bricks can be formed in a conventional manner, and the plate 12 put in place as a separate subsequent step.

The conventional procedure in lining furnaces of the kind herein involved is to lay the bricks in soldier style as shown in Fig. 4 with the hot ends of the bricks pointing inwardly toward the furnace cavity. In Fig. 2 of the drawing, there is shown a section through three conventional, unplated, alumina-type bricks CB in the wall of a furnace which has been in use for a prolonged period. The original or as-installed condition of the bricks CB is indicated in dotted lines at CB'. During the course of use of the furnace for refining or alloying molten aluminum, say at about 1500° F., the molten aluminum, having an affinity for silica, attacked the conventional bricks CB'. This attack is most pronounced at the brick side wall joints J, and to a lesser extent at the ends of the bricks CB', so that after a given period of furnace operation the bricks are in a corroded state CB. This phenomenon becomes increasingly worse during progressive use of the furnace, and the bottom wall of the furnace accumulates deeper and deeper deposits of crust-like impurities, until the condition is reached where the furnace must be shut down, cleaned and relined with fresh bricks replacing the corroded bricks CB.

Under the present invention, the aluminum plate 12 is present at the joint surfaces J' between the bricks as shown in Fig. 4 which is a schematical perspective view of a furnace having walls lined with bricks 10 of the present invention. The aluminum plate 12 oxidizes to form alumina to some extent of its own accord while the bricks 10 are stacked prior to installation, and to an accelerated extent after the furnace is lined with bricks 10 and first brought up to heat. As a consequence of such oxidation of the plating 12, the cores 11 of the bricks become encased in highly refractory essentially pure alumina plates 12', Fig. 3, and these alumina plates 12' act as refractory, non-corrosive shields at the joints J' substantially preventing penetration of molten aluminum into the bricks from the joints J' thereby reducing reaction between aluminum in the furnace and silica in the bricks. The primary advantage of this is that the corrosive action of molten aluminum on silica at the joints J' is greatly restricted and occurs primarily only at the exposed ends of the bricks 10.

While I have described a preferred embodiment of my invention it is to be understood that this is capable of variation and modification, and I therefore do not wish to be limited to the precise details set forth, but desire to avail myself of such changes and alterations as fall within the purview of the following claim.

I claim:

In a furnace for molten aluminum, side and bottom walls lined with refractory bricks laid in soldier style, said bricks each having a core essentially of alumina but containing some silica, said bricks each having elongated rectangular sides and substantially square ends and being of substantially uniform cross-section throughout, and said bricks in as-installed state having bare ends and being clad in aluminum plate present at the joints between individual ones of said bricks at the elongated sides of the bricks, whereby said plate upon oxidizing to alumina forms a refractory shield of alumina at such joints preventing corrosive action of aluminum on silica in said bricks.

References Cited in the file of this patent
UNITED STATES PATENTS

| | | |
|---|---|---|
| 2,086,525 | Akers | July 13, 1937 |
| 2,148,054 | Berlek | Feb. 21, 1939 |
| 2,154,813 | Heuer | Apr. 18, 1939 |
| 2,174,597 | Pyster et al. | Oct. 3, 1939 |
| 2,652,793 | Heuer et al. | Sept. 22, 1953 |
| 2,829,877 | Davis | Apr. 8, 1958 |